United States Patent [19]

Mohrmann et al.

[11] Patent Number: 5,685,066
[45] Date of Patent: Nov. 11, 1997

[54] TUBE EXPANDING ASSEMBLY

[75] Inventors: David G. Mohrmann; Dennis P. Laloge, both of Connersville, Ind.

[73] Assignee: Ford Global Technologies, Inc., Dearborn, Mich.

[21] Appl. No.: 553,734

[22] Filed: Oct. 23, 1995

[51] Int. Cl.$^6$ ................................ B23P 15/26
[52] U.S. Cl. .................. 29/723; 29/726; 29/727
[58] Field of Search ............... 29/727, 726, 890.043, 29/890.031, 906, 723

[56] References Cited

U.S. PATENT DOCUMENTS

| | | | |
|---|---|---|---|
| 4,597,171 | 7/1986 | Kitayama et al. | 29/727 |
| 4,757,746 | 7/1988 | Ginzburg | 91/361 |
| 4,771,536 | 9/1988 | Vanderlaan et al. | 29/727 |
| 4,835,828 | 6/1989 | York et al. | 29/727 |
| 5,040,405 | 8/1991 | Honma et al. | 72/462 |
| 5,097,590 | 3/1992 | Tokura | 29/727 |
| 5,099,677 | 3/1992 | Tokura | 72/456 |
| 5,220,722 | 6/1993 | Milliman | 29/727 |

FOREIGN PATENT DOCUMENTS

| | | |
|---|---|---|
| 0174234 | 10/1984 | Japan . |
| 2157986 | 11/1985 | United Kingdom . |

*Primary Examiner*—Irene Cuda
*Attorney, Agent, or Firm*—Raymond L. Coppiellie; Roger L. May

[57] ABSTRACT

A tube expanding assembly expands a plurality of tubes used in combination with a plurality of fins and end sheets to form a heat exchanger, the tube expanding assembly includes a nest plate secured to the base wherein the nest plate holds the tubes thereon, a bolster cylinder extendable between the base and the nest plate for moving the nest plate relative to the base, a ram support disposed above the base, a ram plate secured to the ram support, a ram cylinder depending from the ram support and secured to the ram plate wherein the ram cylinder moves the ram plate relative to ram support, a plurality of expansion rods depending from the ram plate wherein each of expansion rods is extendable through each of the tubes such that the tubes engage the fins and end sheets, and a plurality of transducers, each of the transducers are associated with each of the bolster cylinder and the ram cylinder such that the transducers create signals identifying position of each of the ram plate and the nest plate.

13 Claims, 3 Drawing Sheets

TUBE EXPANDING ASSEMBLY

BACKGROUND OF THE INVENTION

1. Field of the Invention

The present invention relates to tube expanders and, more particularly, to tube expanders for expanding tubes to be secured to fins and end sheets to form heat exchangers.

2. Description of Related Art

Heat exchangers using tubes, fins, and end sheets are assembled using mechanical tube expanders. More specifically, the mechanical tube expander expands the tubes such that they are securely fixed to the fins and end sheets through an interference fit. The length of the expanded tubes determines the height of the resulting heat exchanger. Finished coil assemblies come in a variety of heights and widths. The mechanical tube expanders include housings into which the tubes, fins, and end sheets are fixed so as to maintain the structural integrity thereof during the expansion process. Prior art expanders generally have no mechanism for accurately controlling the velocity or position of the ram plate or bolster plate nor any other related moving parts and thus in these prior art devices it is difficult to repeat the expansion process with accuracy. Accurate control of the velocity and position of the ram plate, bolster plate as well as other interrelated moving parts increases the repeatability of the tube expansion process and therefore the quality of the heat exchangers manufactured therefrom as well as reduces scrap rates.

SUMMARY OF THE INVENTION

Accordingly, a tube expanding assembly for expanding a plurality of tubes used in combination with a plurality of fins and two end sheets as a heat exchanger is disclosed. The tube expanding assembly includes a base. A nest plate is secured to the base wherein the nest plate holds the plurality of tubes thereon. A bolster assembly extends between the base and the nest plate and moves the nest plate relative to the base. A ram support is disposed above the base. A ram plate is secured to the ram support by a ram cylinder which depends from the ram support. The ram cylinder moves the ram plate relative to the support. A plurality of expansion rods depends from the ram plate. Each of the expansion rods is extendable through each of the tubes such that the tubes engage the fins and end sheets. Transducers are associated with each of the bolster cylinders and the ram cylinder. The transducers create signals identifying the position of each of the ram plate and the nest plate which is, in turn, fixed to the bolster plate.

One advantage associated with the present invention is the ability to monitor the speed in which the ram and bolster cylinders are moving. Another advantage associated with the present invention is the ability to locate the position of the ram and bolster cylinder rods which, in turn, provides the location of the nest and ram plates, respectively. With knowledge of the position and velocity of the nest and ram plates, the machine process can be tightly controlled, resulting in increased repeatability of the tube expansion process and higher part quality, and reduced scrap costs.

Other advantages and features of the present invention will be readily appreciated as the same becomes better understood by reference to the subsequent description when considered in connection with the accompanying drawings.

DESCRIPTION OF THE PREFERRED EMBODIMENT(S)

Figure 1:
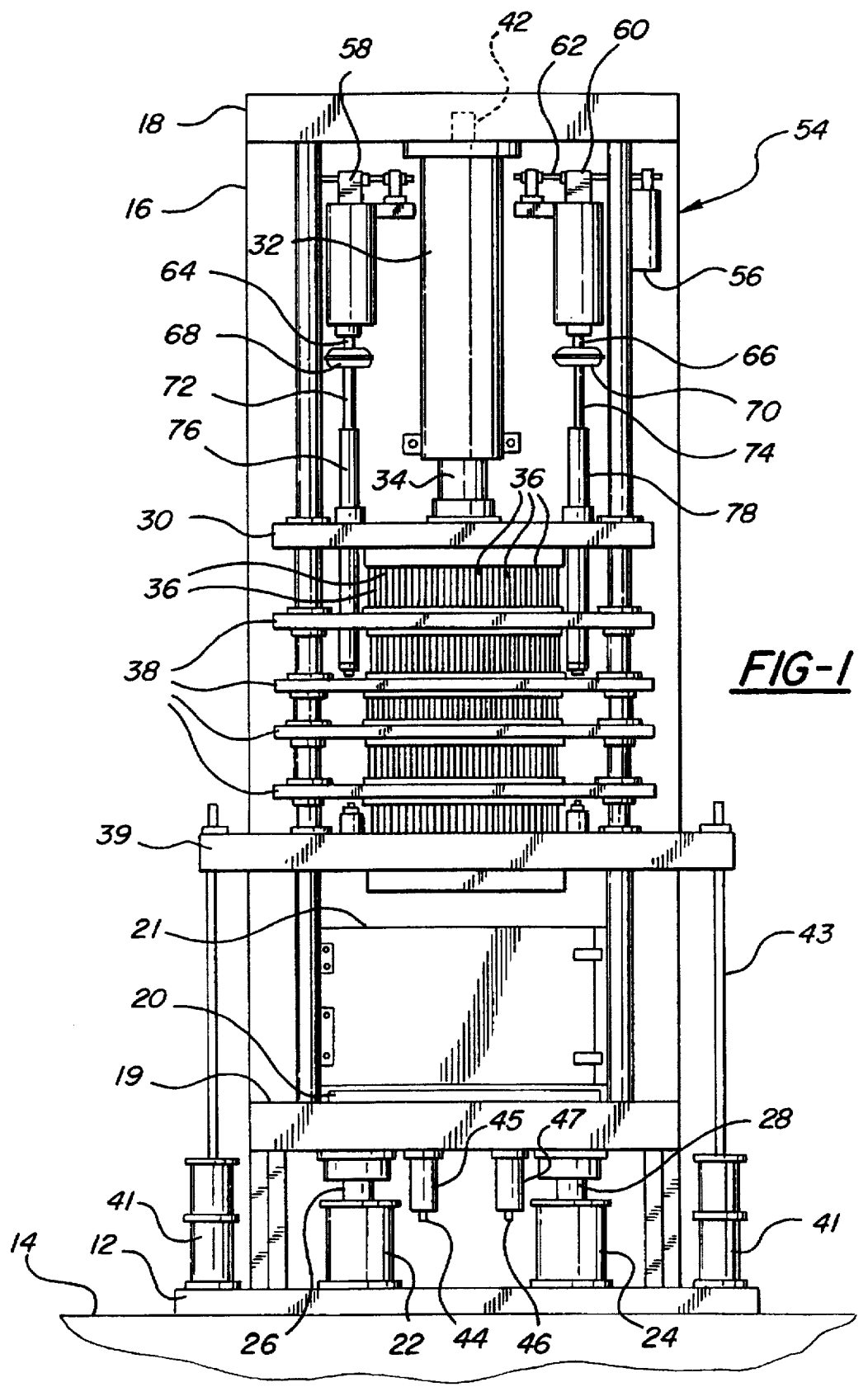
FIG. 1 is a front side view of one embodiment of the present invention in a retracted position.

Referring to FIG. 1, one embodiment of a tube expanding assembly is generally indicated at 10. The tube expanding assembly 10 includes a base 12 which rests on a floor 14. Extending upwardly from the base 12 is a rear support 16. The rear support 16 may be a solid structure or, in the alternative, it may be a frame-type structure. The rear support 16 supports a ram support 18 a predetermined distance from the base 12.

A housing support 19 is secured to the base 12 thereabove. The housing support 19 surrounds a nest plate 20 which holds each of the plurality of tubes (not shown) thereon for proper placement and alignment with respect to a plurality of fins and end sheets (not shown). The nest plate 20 is not attached to the housing support 19. The tubes, fins, and end sheets are held in position by a housing 21 which sits on the housing support 19.

The nest plate 20 is secured to a bolster plate (not shown) which is secured to a bolster cylinder 22 which is secured to the base 12. In the embodiment shown in FIG. 1, a second bolster cylinder 24 is incorporated. The first bolster cylinder 22 and the second bolster cylinder 24 are hereinafter referred to as the bolster cylinders 22, 24. Each of the bolster cylinders, 22, 24 includes a cylinder rod 26, 28 which extend the support 19 upwardly. Further, the bolster cylinders 22, 24, are hydraulic, maximizing the control thereof.

Extending down from the ram support 18 is a ram plate 30. The ram plate 30 is secured to the ram support 18 through a ram cylinder 32. The ram cylinder 32 is hydraulically actuated and includes a cylinder rod 34 which telescopingly moves into and out of the ram cylinder 32 moving the ram plate relative to the ram support 18.

Depending from the ram plate 30 are a plurality of expansion rods 36. Each of the expansion rods 36 include a bullet (not shown). The plurality of expansion rods 36 are extendable through each of the tubes such that the tubes are forced outwardly by the bullets increasing their inner and outer diameters which results in the engagement of the tubes with each of the plurality of fins and end sheets. A plurality of expansion guides 38 help guide and support the expansion rods 36 so that the expansion rods 36 do not bend nor move out of alignment as they are being forced through the tubes. Each of the expansion guides 38 includes a guide block 40 allowing the expansion rods 36 to move relative to the expansion guides 38.

A stripper plate 39 is movable with respect to the base 12. Two counterbalance cylinders 41 translate the stripper plate 39, via two vertical guides 43, down to insure the tubes do not move upwardly with the expansion rods 36. Counterbalance blocks 43 force the stripper plate 39 down when the counterbalance cylinders 41 contract.

The ram cylinder 32 is a hydraulic cylinder and includes a ram transducer 42. The ram transducer 42 is a linear displacement transducer which determines the linear displacement of the ram cylinder rod 32 extending down or retracting back up. The ram transducer 42 sends a signal back to an electronic controller 92, discussed subsequently.

so that the electronic controller 92 may accurately determine the location of the ram plate 30.

Likewise, each bolster cylinder 22, 24 includes a bolster transducer 44, 46, respectively. The bolster transducers 44, 46 are secured to two transducer cylinders 45, 47. The bolster transducers 44, 46 are also linear displacement transducers and determine the location of the nest plate 20.

A screw height adjust assembly is generally shown at 54. The screw height adjust assembly 54 includes a motor 56 which is connected to two ram height adjust sprockets 58, 60 through a drive chain 62. The sprockets 58, are each attached to a stub shaft 64, 66 which are, in turn, secured to a coupling 68, 70. Coupled to the stub shafts 64, 66 are two pieces of square bar stock 72, 74. Two ram screws 76, 78 move up and down relative to the square bar stock 72, 74. ACME Allthread, a trademark, is used as a type of ram screw which may be employed in one embodiment of the present invention. The screw height adjust assembly 54 adjusts the height of the ram screws 76, 78 to accommodate the particular length of the heat exchanger being manufactured as is commonly known in the art.

Figure 3:
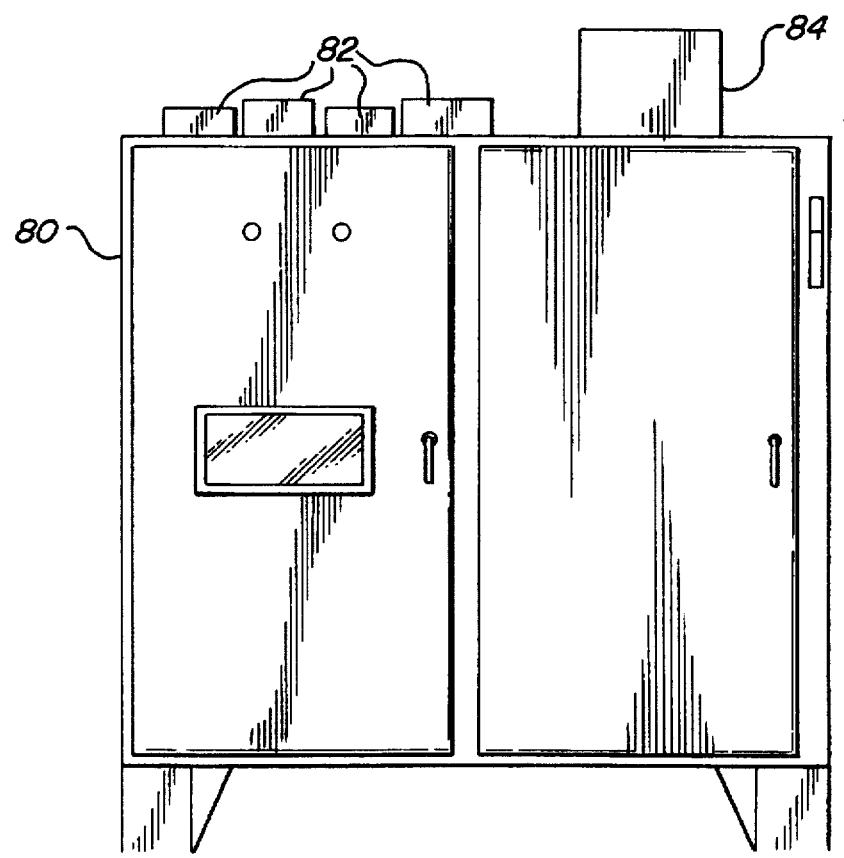
FIG. 3 is a side view of the control enclosure for the electronics.

A cabinet 80, shown in detail in FIG. 3, houses the electronic controls for the tube expanding assembly 10. As may seen in FIG. 3, a number of transformers 82 and a power factor correction capacitor 84 are housed on top of the cabinet 80.

Figure 2:
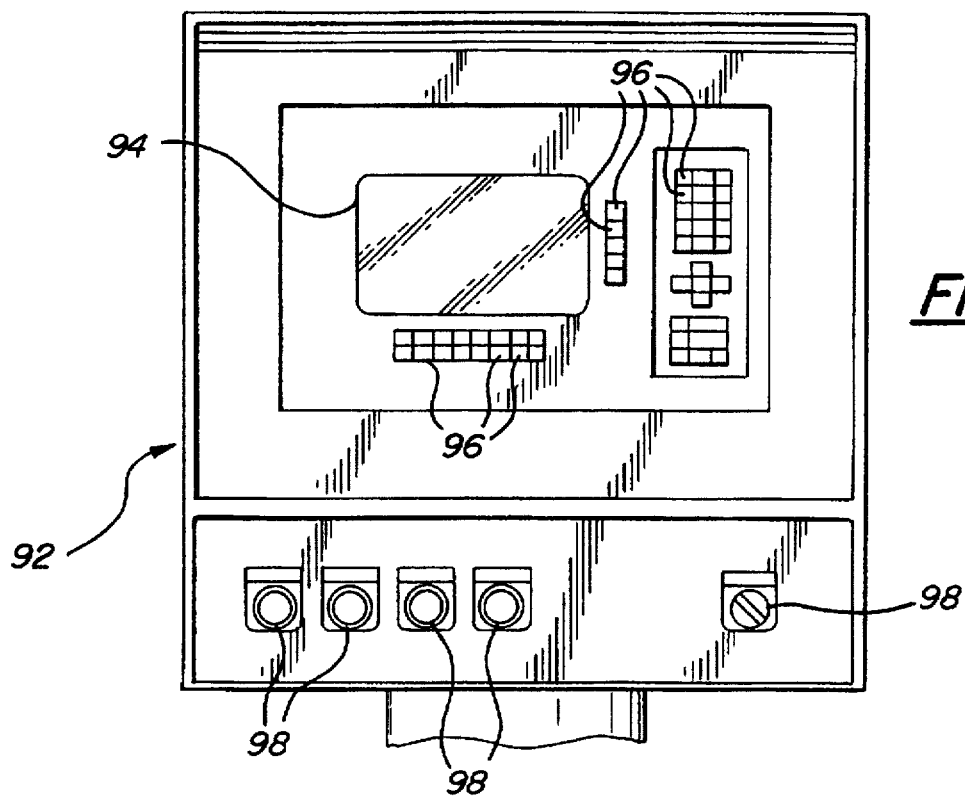
FIG. 2 is a side view of an operator interface for one embodiment of the present invention.

Referring to FIG. 2, an operator interface is generally indicated at 92. The operator interface has a cathode ray tube (CRT) 94 and a plurality of control buttons 96. The control buttons 96 allow the operator to move through control screens and select proper selections and parameters. Below the CRT 94 are a plurality of manual controls 98 which offer additional operator control of the tube expanding assembly 10.

Figure 4:
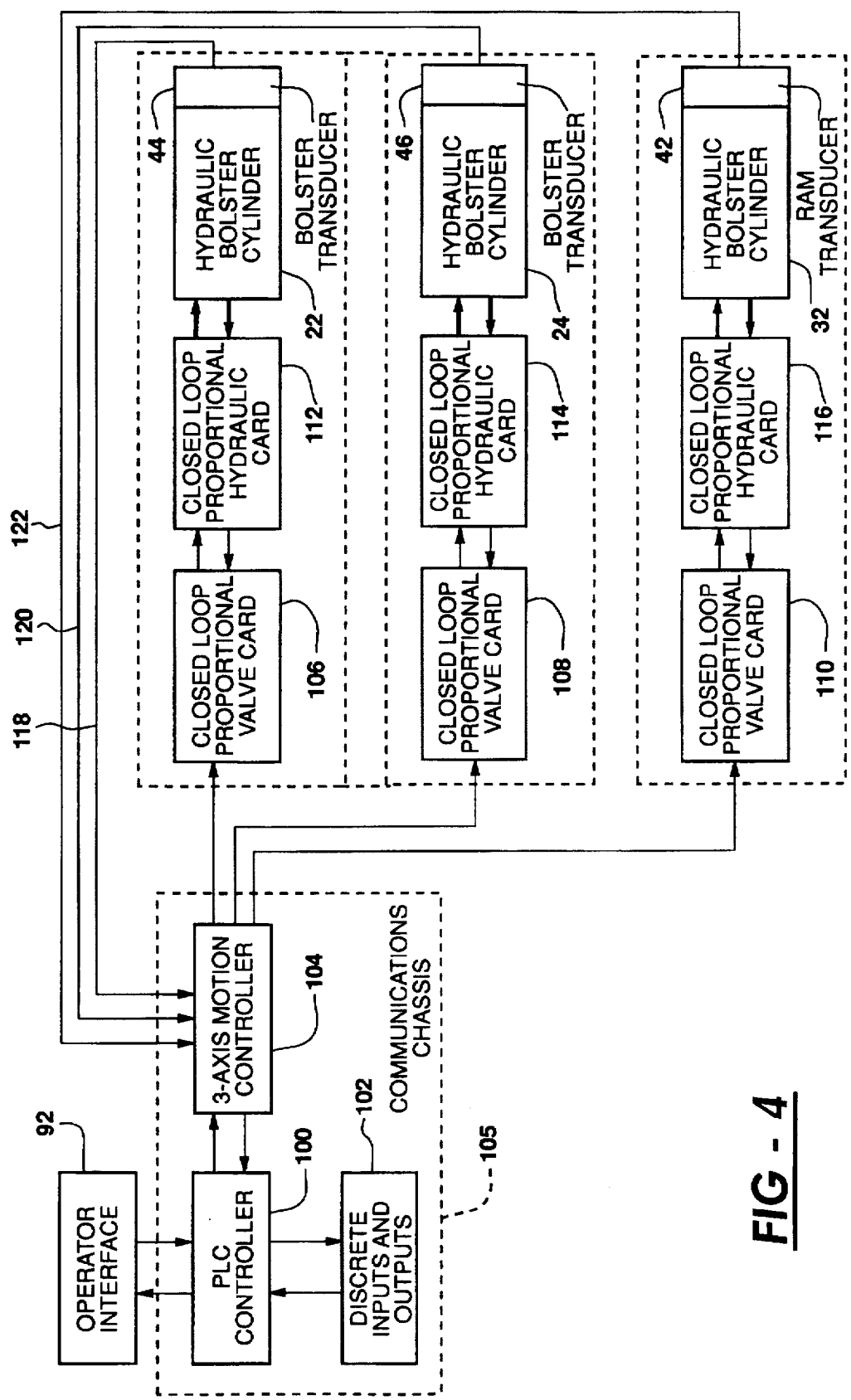
FIG. 4 is a block diagram of one embodiment of the present invention.

Referring to FIG. 4, a block diagram of the tube expanding assembly 10 is shown. The operator interface 92 transmits and receives data to and from a PLC controller 100. The PLC controller 100 also transmits and receives data from discrete inputs and outputs 102. The PLC controller 100 also transmits and receives data from a three-axis motion controller 104. The PLC controller 100, discrete inputs and outputs 102, and the three-axis motion controller 104 all communicate using a communications chassis 105, an Allen Bradley brand chassis in one embodiment.

The three-axis motion controller 104 transmits command signals to three closed loop proportional valve cards, 106, 108, 110. Each of the three closed loop proportional valve cards 106, 108, 110 are associated with each of the bolster cylinders 22, 24 and the ram cylinder 32. The closed loop proportional valve control cards 106, 108, 110 all transmit command signals to the closed loop proportional hydraulic valves 112, 114, 116. The closed loop proportional hydraulic valves 112, 114, 116 translate the command signals received from the proportional valve control cards 106, 108, 110 into fluid controls to control the amount of fluid moving into and out of the bolster cylinders 22, 24 and the ram cylinder 32 independently. The closed loop proportional hydraulic valves 112, 114, 116 also send an electrical signal back to their respective closed loop proportional valve control cards 106, 108, 110 to indicate to them the valve spool positions thereof. This provides a proportional feedback, to be discussed subsequently.

The position of the cylinder rods, the bolster cylinders 22, 24, and the ram cylinder 32 is translated into an electrical signal by the bolster transducers 44, 46 and the ram transducer 42. These signals are transmitted back to the three-axis motion controller 104 through position feedback lines 118, 120, 122. The signals transmitted through the feedback lines 118, 120, 122, in combination with the feedback from the closed loop proportional hydraulic valves 112, 114, 116 create a highly accurate feedback system to allow exact control of the cylinder rods of the bolster cylinders 22, 24 and the ram cylinder 32 which, in turn, results in precise control of the nest plate 20 motion and ram plate 30 motion. Accurate control of the velocity and position of the ram plate, bolster plate as well as other interrelated moving parts increases the repeatability of the tube expansion process and therefore the quality of the heat exchangers manufactured therefrom.

The present invention has been described in an illustrative manner. The terminology which has been used is intended to be in the nature of words of description rather than of limitation.

Modifications and variations of the present invention are possible in light of the above teachings. Therefore, within the scope of the appended claims, the present invention may be practiced otherwise than as specifically described.

What is claimed is:

1. A tube expanding assembly for expanding a plurality of tubes used in combination with a plurality of fins and end sheets as a heat exchanger, said tube expanding assembly comprising:

a base;

a nest plate secured to said base, said nest plate holding the tubes thereon;

a bolster cylinder extendable between said base and said nest plate and moving said nest plate relative to said base;

a ram support disposed above said base;

a ram plate secured to said ram support;

a ram cylinder depending from said ram support and secured to said ram plate, said ram cylinder moving said ram plate relative to said ram support;

a plurality of expansion rods depending from said ram plate, each of said expansion rods extendable through each of the tubes such that said tubes engage the fins and end sheets; and a plurality of transducers, each of said transducers associated with each of said bolster cylinder and said ram cylinder such that said transducers create signals identifying the position of each of said ram plate and said nest plate.

2. A tube expanding assembly as set forth in claim 1 wherein said bolster cylinder is hydraulic.

3. A tube expanding assembly as set forth in claim 2 wherein said ram cylinder is hydraulic.

4. A tube expanding assembly as set forth in claim 1 wherein said transducers are linear displacement transducers.

5. A tube expanding assembly as set forth in claim 4 including a plurality of transducer cylinders, each of said transducers cylinders housing each of said linear displacement transducers.

6. A tube expanding assembly as set forth in claim 3 wherein said bolster cylinder includes a bolster proportional hydraulic valve to control fluid flow into and out of said bolster cylinder.

7. A tube expanding assembly as set forth in claim 6 wherein said ram cylinder includes a ram proportional hydraulic valve to control fluid into and out of said ram cylinder.

8. A tube expanding assembly as set forth in claim 7 including a electronic controller for controlling said bolster proportional valve and said ram proportional valve.

9. A tube expanding assembly as set forth in claim 1 including a second bolster cylinder.

10. A tube expanding assembly for expanding a plurality of tubes used in combination with a plurality of fins and end sheets as a heat exchanger, said tube expanding assembly comprising:

a base;

a nest plate secured to said base, said nest plate holding the tubes thereon;

a bolster cylinder extendable between said base and nest plate and moving said nest plate relative to said base;

a ram support disposed above said base;

a ram plate secured to said ram support;

a ram cylinder depending from said ram support and secured to said ram plate, said ram cylinder moving said ram plate relative to said ram support;

a plurality of expansion rods depending from said ram plate, each of said expansion rods extendable through each of the tubes such that the tubes engage the fins and end sheets;

a plurality of transducers, each of said transducers associated with each of said bolster cylinder and said ram cylinder such that said transducers create signals identifying the position of each of said ram plate and said nest plate;

a bolster proportional hydraulic valve for controlling fluid flow into and out of said bolster cylinder;

a ram proportional hydraulic valve to control fluid flow into and out of said ram cylinder;

an electronic controller for controlling said bolster proportional valve and said ram proportional valve; and a feedback circuit connected between said transducers and said electronic controller such that each of said transducers transmits a position feedback signal to said electronic controller wherein said electronic controller modifies control of said bolster proportional hydraulic valve and said ram proportional hydraulic valve based upon said position feedback signal.

11. A tube expanding assembly as set forth in claim 10 wherein said transducers are linear displacement transducers.

12. A tube expanding assembly as set forth in claim 11 including a plurality of transducer cylinders, each of said transducers cylinders housing each of said linear displacement transducers.

13. A tube expanding assembly as set forth in claim 10 including a second bolster cylinder.

* * * * *